(12) United States Patent
Johnson et al.

(10) Patent No.: US 8,756,930 B2
(45) Date of Patent: Jun. 24, 2014

(54) HYDRAULIC SYSTEM HAVING IMPLEMENT AND STEERING FLOW SHARING

(75) Inventors: Bryan A. Johnson, Montgomery, IL (US); Jason L. Brinkman, Peoria, IL (US); Lawrence J. Tognetti, Peoria, IL (US); Chris R. Cesur, Lombard, IL (US); Peter Spring, Montgomery, IL (US); Jiao Zhang, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 1062 days.

(21) Appl. No.: 12/790,402

(22) Filed: May 28, 2010

(65) Prior Publication Data

US 2011/0289908 A1    Dec. 1, 2011

(51) Int. Cl.
*B62D 5/07* (2006.01)
*F15B 11/16* (2006.01)

(52) U.S. Cl.
USPC .................. 60/430; 60/452; 91/516

(58) Field of Classification Search
CPC ...... B62D 5/075; F15B 11/162; F15B 11/165
USPC ...................... 60/430, 452; 91/516
See application file for complete search history.

(56) References Cited

U.S. PATENT DOCUMENTS

| | | | |
|---|---|---|---|
| 3,987,623 A | 10/1976 | Bianchetta | |
| 3,994,133 A | 11/1976 | Pfeil et al. | |
| 4,043,419 A | 8/1977 | Larson et al. | |
| 4,044,786 A | 8/1977 | Yip | |
| 4,422,290 A | 12/1983 | Huffman | |
| 4,449,365 A | 5/1984 | Hancock | |
| 4,635,439 A | 1/1987 | Wible | |
| 4,663,936 A | 5/1987 | Morgan | |
| 5,267,440 A * | 12/1993 | Nakamura et al. | 60/452 |
| 6,176,083 B1 | 1/2001 | Ikari | |
| 6,205,781 B1 | 3/2001 | A'Hearn | |
| 7,464,545 B2 | 12/2008 | Vigholm | |
| 2008/0209903 A1 | 9/2008 | Itoga et al. | |
| 2009/0121540 A1* | 5/2009 | Gales | 303/5 |
| 2010/0031648 A1 | 2/2010 | Choi et al. | |
| 2011/0030364 A1 | 2/2011 | Persson et al. | |

FOREIGN PATENT DOCUMENTS

| | | |
|---|---|---|
| EP | 2065519 | 6/2009 |
| EP | 2184495 | 5/2010 |
| KR | 1020100018971 | 2/2010 |
| WO | 2009102740 | 8/2009 |

OTHER PUBLICATIONS

U.S. Appl. No. 12/624,832, filed Nov. 24, 2009.

* cited by examiner

*Primary Examiner* — F. Daniel Lopez
(74) *Attorney, Agent, or Firm* — Finnegan, Henderson, Farabow, Garrett & Dunner LLP (57) ABSTRACT

A hydraulic system for a machine is disclosed. The hydraulic system may have a first pump with variable displacement and being load-sense controlled, and a first hydraulic circuit associated with the first pump. The hydraulic system may also have a second pump with variable displacement and being electro-hydraulically controlled, and a second hydraulic circuit associated with the second pump. The hydraulic system may further have a flow-sharing valve arrangement configured to selectively share fluid flow between the first and second hydraulic circuits.

18 Claims, 4 Drawing Sheets

HYDRAULIC SYSTEM HAVING IMPLEMENT AND STEERING FLOW SHARING

TECHNICAL FIELD

The present disclosure relates generally to a hydraulic system, and more particularly to a hydraulic system having implement and steering flow sharing.

BACKGROUND

Machines, for example wheel loaders, motor graders, excavators, and dozers are commonly used in material moving applications such as mining, road maintenance, and surface contouring. To effectively accomplish tasks associated with these applications, the machines are typically outfitted with steering components such as hydraulically-powered articulation joints and/or traction devices, and hydraulically powered implements such as shovels, buckets, and blades. A prime mover, for example a diesel, gasoline, or gaseous fuel-powered engine, drives dedicated steering and implement pumps that provide hydraulic power to the steering components and the implements.

The steering pump can be driven by the prime mover to pressurize fluid in response to a fluid demand from steering actuators during a steering event. When no fluid demand exists or when the fluid demand is relatively low, the steering pump may have excess capacity to pressurize fluid.

Hydraulically powered implements are typically velocity controlled based on an actuation position of an operator interface device. For example, an operator interface device such as a joystick, a pedal, or any other suitable operator interface device is movable to generate a signal indicative of a desired velocity of an associated hydraulic actuator. When an operator moves the interface device, the operator expects the hydraulic actuator to move the implement at an associated velocity. However, when multiple actuators are simultaneously operated, the hydraulic fluid flow from a single implement pump can be insufficient to move all of the actuators at their desired velocities. Situations also exist where the single implement pump is undersized and the desired velocity of a single actuator requires a fluid flow rate that exceeds the flow capacity of the single implement pump.

When the steering pump has excess capacity and the implement pump has insufficient capacity to supply a commanded/demanded flow of pressurized fluid, it may be desirable to share pressurized fluid between steering and implement circuits. One example of a system that provides for flow sharing between steering and implement circuits is described in U.S. Pat. No. 4,422,290 (the '290 patent) issued to Huffman on Dec. 27, 1983. The '290 patent describes a hydraulic control system that includes a pressure compensator for diverting excess fluid from a steering pump to an implement control valve based on a fluid pressure within a steering circuit. A solenoid-operated control valve is provided between the pressure compensator and the implement control valve for selectively allowing or blocking fluid flow between the steering circuit and an implement circuit.

Although potentially helpful in some situations, the hydraulic control system of the '290 patent may be problematic. In particular, the disclosed system provides no control for variable displacement type pumps (load-sense or electro-hydraulic pumps), and provides excess fluid flow from the steering pump to the implement circuit regardless of a demand for pressurized fluid flow in the implement circuit. For these reasons, the hydraulic control system of the '290 patent may be inefficient and have limited applicability.

The disclosed hydraulic system is directed to overcoming one or more of the problems set forth above and/or other problems of the prior art.

SUMMARY

In one aspect, the present disclosure is directed to a hydraulic system. The hydraulic system may include a first pump having variable displacement and being load-sense controlled, and a first hydraulic circuit associated with the first pump. The hydraulic system may also have a second pump having variable displacement and being electro-hydraulically controlled, and a second hydraulic circuit associated with the second pump. The hydraulic system may further have a flow-sharing valve arrangement configured to selectively share fluid flow between the first and second hydraulic circuits.

In another aspect, the present disclosure is directed to a method of sharing fluid between a steering circuit and an implement circuit. The method may include pressurizing fluid within the steering circuit based on a pressure within the steering circuit, and pressurizing fluid within the implement circuit based on an operator demand for fluid in the implement circuit. The method may also include determining that a maximum capacity for pressurizing fluid within the implement circuit has been reached, and selectively sharing pressurized fluid from the steering circuit with the implement circuit based on the determination.

DETAILED DESCRIPTION

Figure 1:
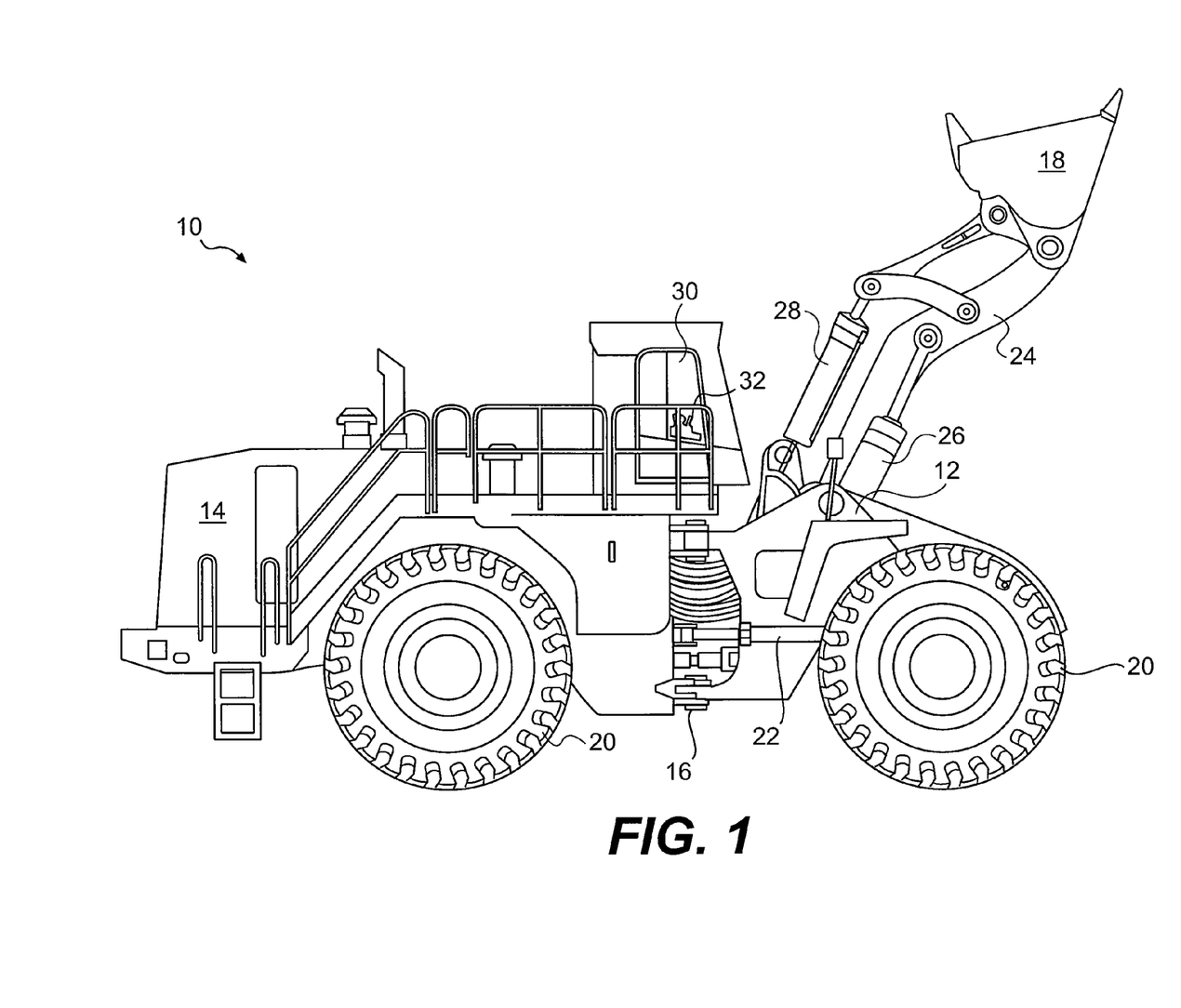
FIG. 1 is a diagrammatic illustration of an exemplary disclosed machine.

FIG. 1 illustrates an exemplary disclosed machine 10. Machine 10 may be a mobile machine that performs some type of operation associated with an industry such as mining, construction, farming, or any other industry known in the art. For example, machine 10 may be a material moving machine such as a wheel loader, an excavator, a backhoe, a motor grader, or any other suitable operation-performing machine. Machine 10 may include a frame 12, a power source 14 supported by frame 12, a steering component 16, and an implement 18. Steering component 16 and implement 18 may be driven by power source 14 to steer machine 10 and to move relative to frame 12, respectively.

Frame 12 may include any structural member or assembly of members that supports movement of machine 10. For example, frame 12 may embody a stationary base frame connecting power source 14 to one or more traction devices 20 and/or to implement 18. Alternatively, frame 12 may embody a movable frame member of a linkage system.

Power source 14 may be an engine, for example, a diesel engine, a gasoline engine, a gaseous fuel-powered engine such as a natural gas engine, or any other engine apparent to one skilled in the art. Power source 14 may also embody another source of power such as a fuel cell, a power storage device, or any other source of power. Power source 14 may be supported by frame 12 and configured to produce a mechanical and/or electrical power output used to drive operation of steering component 16 and implement 18.

Steering component 16, in one embodiment, may include a centrally-located articulation joint. To affect steering of machine 10, a hydraulic actuator 22 located on one side of machine 10 may extend while a similar hydraulic actuator 22 (not shown) located on an opposite side of machine 10 simultaneously retracts. The paired extension and retraction of the opposing hydraulic cylinders 22 may cause a forward-end of machine 10 to pivot about steering component 16 relative to a back-end of machine 10. It is contemplated that steering component 16 may alternatively or additionally include a rack and pinion mechanism, independent gear drives or motors associated with individual traction devices 20, or other steering components known in the art, if desired.

Implement 18 may embody a specialized device used in the performance of a particular task. For instance, implement 18 may embody a bucket, a blade, a shovel, a ripper, a dump bed, a propelling device, or any other task-performing device known in the art. Implement 18 may be connected to frame 12 via a linkage system 24 and movable relative to frame 12 by way of one or more hydraulic actuators 26, 28. Although shown as being lifted and tilted by hydraulic actuators 26, 28, respectively, it is contemplated that implement 18 may alternatively or additionally be configured to pivot, rotate, slide, swing, or move in any other way relative to frame 12, if desired.

Steering and implement control of machine 10 may be provided by way of an operator station 30. Operator station 30 may be supported by frame 12 and include one or more operator interface devices 32, for example, a steering wheel, single or multi-axis joysticks, switches, knobs, or other known devices that are located proximal to an operator seat. Operator interface devices 32 may be proportional-type controllers configured to generate control signals indicative of a desired position, force, velocity, and/or acceleration of hydraulic actuators 22, 26, and 28.

Figure 2:
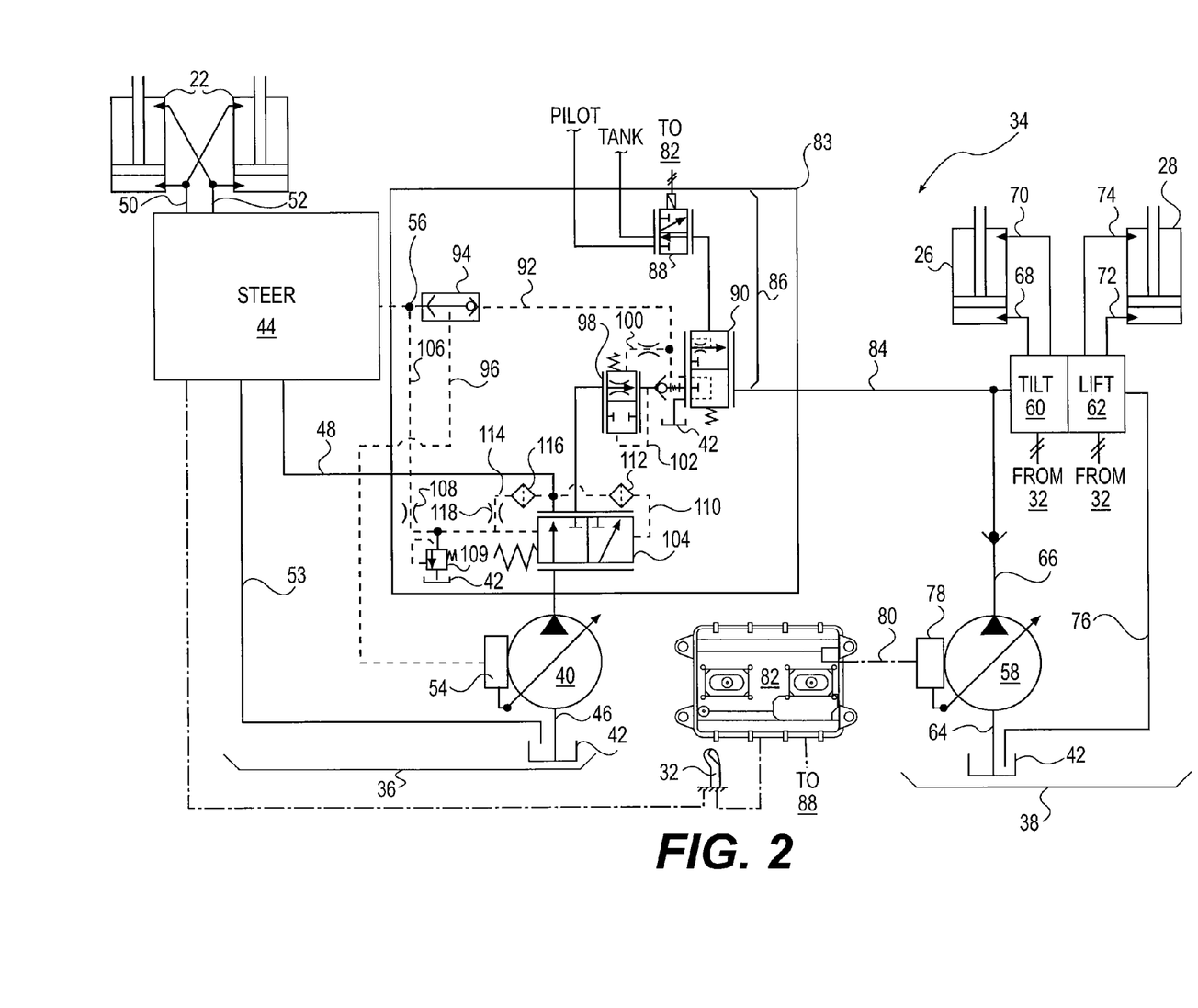
FIG. 2 is a schematic and diagrammatic illustration of an exemplary disclosed hydraulic system that may be used with the machine of FIG. 1 during a first mode of operation.

As illustrated in FIG. 2, hydraulic actuators 22, 26, and 28 may be components of a larger hydraulic system 34. Hydraulic system 34 may include a steering circuit 36 and an implement circuit 38. Steering circuit 36 may function to supply hydraulic actuator 22 with pressurized fluid to move steering component 16 and thereby steer machine 10. Implement circuit 38 may function to supply hydraulic actuators 26 and 28 with pressurized fluid to move implement 18 relative to frame 12.

Steering circuit 36 may include a steering pump 40 configured to draw fluid from a low-pressure reservoir 42, pressurize the fluid, and direct the pressurized fluid to hydraulic actuators 22 by way of a steering control valve 44. Steering pump 40 may be connected to low-pressure reservoir 42 via a tank passage 46 and to steering control valve 44 via a supply passage 48. Steering control valve 44 may be connected to hydraulic cylinders 22 by way of first and second passages 50, 52 and to low-pressure reservoir 42 by way of a drain passage 53.

Steering pump 40 may have variable displacement and be load-sense controlled. That is, steering pump 40 may include a stroke-adjusting mechanism 54, for example a swashplate or spill valve, a position of which is selectively adjusted based on a sensed load of steering circuit 36 to thereby vary an output of (i.e., a rate at which fluid is pressurized by) steering pump 40. In one embodiment, a load-sense passage 56 may direct a pressure signal from a location downstream of steering control valve 44 to stroke-adjusting mechanism 54. Based on a value of the signal (i.e., based on a pressure of signal fluid within load-sense passage 56) directed to stroke-adjusting mechanism 54, the position of stroke-adjusting mechanism 54 may change to either increase or decrease the output of steering pump 40. For the purposes of this disclosure, a load-sense controlled pump may be considered a pump that is hydro-mechanically controlled to vary a displacement based on a load of the circuit receiving fluid from the pump, a pilot signal indicative of the load being directed to a displacement mechanism of the pump.

Steering control valve 44 may selectively connect first and second passages 50, 52 to supply and drain passages 48, 53 to steer machine 10. For example, to turn machine 10 to the right, steering control valve 44 may connect first passage 50 to supply passage 48, while simultaneously connecting second passage 52 to drain passage 53. This operation may cause the left-most hydraulic actuator 22 (as viewed in FIG. 2) to extend and the right-most hydraulic actuator 22 to retract, thereby pivoting the front end of machine 10 clockwise (when viewed from above) about steering component 16. To turn machine 10 to the left, steering control valve 44 may connect first passage 50 to drain passage 53, while simultaneously connecting second passage 52 to supply passage 48. This operation may cause the right-most hydraulic actuator 22 to extend and the left-most hydraulic actuator 22 to retract, thereby pivoting the front end of machine 10 counterclockwise about steering component 16.

Implement circuit 38 may include an implement pump 58 configured to draw fluid from low-pressure reservoir 42, pressurize the fluid, and direct the pressurized fluid to hydraulic actuators 26, 28 by way of a tilt control valve 60 and a lift control valve 62, respectively. Implement pump 58 may be connected to low-pressure reservoir 42 by way of a tank passage 64 and to tilt and lift control valves 60, 62 by way of a supply passage 66. Tilt control valve 60 may be connected to hydraulic actuator 26 by way of head- and rod-end passages 68, 70, while lift control valve 62 may be connected to hydraulic actuator 28 by way of head- and rod-end passages 72, 74. Tilt and lift control valves 60, 62 may be connected to low-pressure reservoir 42 by way of a drain passage 76.

Implement pump 58 may have variable displacement and be electro-hydraulically (E/H) controlled. That is, implement pump 58 may include a stroke-adjusting mechanism 78, for example a swashplate or spill valve, a position of which is selectively adjusted based on an electronic control signal 80 produced by a controller 82 to thereby vary an output (i.e., a flow rate) of implement pump 58. In one embodiment, electronic control signal 80 may be related (e.g., proportional) to a command received from operator input device 32 and correspond to a demanded position, force, velocity, and/or acceleration of hydraulic actuators 26, 28. Based on a value of electronic control signal 80 directed to stroke-adjusting mechanism 78, the position of stroke-adjusting mechanism 78 may change to either increase or decrease the output of implement pump 58, regardless of an immediate pressure within implement circuit 38. For the purposes of this disclosure, an E/H pump may be considered a pump that is electro-hydraulically controlled to vary a displacement based on an electronic signal directed to the pump's displacement mechanism.

Tilt and lift control valves 60, 62 may selectively connect head-end passages 68, 72 and rod-end passages 70, 74 to supply passage 66 and drain passage 76, respectively, to move implement 18. For example, to dump and lift implement 18, tilt and lift control valves 60, 62 may connect head-end passages 68, 72 to supply passage 66, while simultaneously connecting rod-end passages 70, 74 to drain passage 76. This operation may cause both of hydraulic actuators 26, 28 to extend. To rack back and lower implement 18, tilt and lift control valves 60, 62 may connect head-end passages 68, 72 to drain passage 76, while simultaneously connecting rod-end passages 70, 74 to supply passage 66. This operation may cause both of hydraulic actuators 26, 28 to retract. It should be noted that, although hydraulic actuators 26 and 28 have been described as extending and retracting simultaneously, the extensions and retractions of hydraulic actuators 26, 28 may be performed at different times and/or in opposition to each other, if desired.

Controller 82 may be in communication with operator interface device 32, implement pump 58, and other components of steering and/or implement circuits 36, 38 to regulate operations of hydraulic system 34 in response to input from operator interface device 32 and implement pump 58. Controller 82 may embody a single or multiple microprocessors, field programmable gate arrays (FPGAs), digital signal processors (DSPs), etc. that include a means for controlling an operation of hydraulic system 34 in response to the signals received from operator interface device 32 and implement pump 58. Numerous commercially available microprocessors can be configured to perform the functions of controller 82. It should be appreciated that controller 82 could readily embody a microprocessor separate from that controlling other non-hydraulic related power system functions, or that controller 82 could be integral with a general power system microprocessor and be capable of controlling numerous power system functions and modes of operation. If separate from the general power system microprocessor, controller 82 may communicate with the general power system microprocessor via datalinks or other methods. Various other known circuits may be associated with controller 82, including power supply circuitry, signal-conditioning circuitry, actuator driver circuitry (i.e., circuitry powering solenoids, motors, or piezo actuators), and communication circuitry.

Steering and implement circuits 36, 38 may be fluidly interconnected by way of a flow-sharing valve arrangement 83 that is regulated by controller 82. In particular, in some situations, the output of implement pump 58 may be insufficient to satisfy operator demands for implement movement. In these situations, flow-sharing valve arrangement 83 may be controlled to share excess pressurized fluid from steering circuit 36 with implement circuit 38. For this reason, flow-sharing valve arrangement 83 may include a supplemental supply passage 84 that selectively connects steering pump 40 of steering circuit 36 to supply passage 66 and/or tilt and lift control valves 60, 62 of implement circuit 38.

Flow-sharing valve arrangement 83 may also include a control valve 86 associated with supplemental supply passage 84 to regulate fluid flow from steering circuit 36 to implement circuit 38. Control valve 86 may include a solenoid-operated element 88 in communication with controller 82 and fluidly connected to a pilot-operated element 90. Solenoid-operated element 88 may be a proportional type of element that is selectively energized by controller 82 to move to any position between a first position (shown in FIG. 3) at which an end of pilot-operated element 90 is exposed to pressurized pilot fluid, and a second position (shown in FIG. 2) at which the pressurized fluid acting on the end of pilot-operated element 90 is relieved. Pilot-operated element 90 may be moved by pilot fluid passing through solenoid-operated element 88 against a spring bias between a first or flow-passing position (shown in FIG. 3) and a second or flow-blocking position (shown in FIG. 2). When pilot-operated element 90 is in the first position, pressurized fluid from steering circuit 36 may flow to implement circuit 38 via supplemental supply passage 84. When pilot-operated element 90 is in the second position, fluid flow through supplemental supply passage 84 may be inhibited by pilot-operated element 90. The pilot fluid passing through solenoid-operated element 88 to pilot-operated element 90 may be provided by any pump of machine 10, for example by implement pump 58, by steering pump 40, and/or by another pump.

Figure 3:
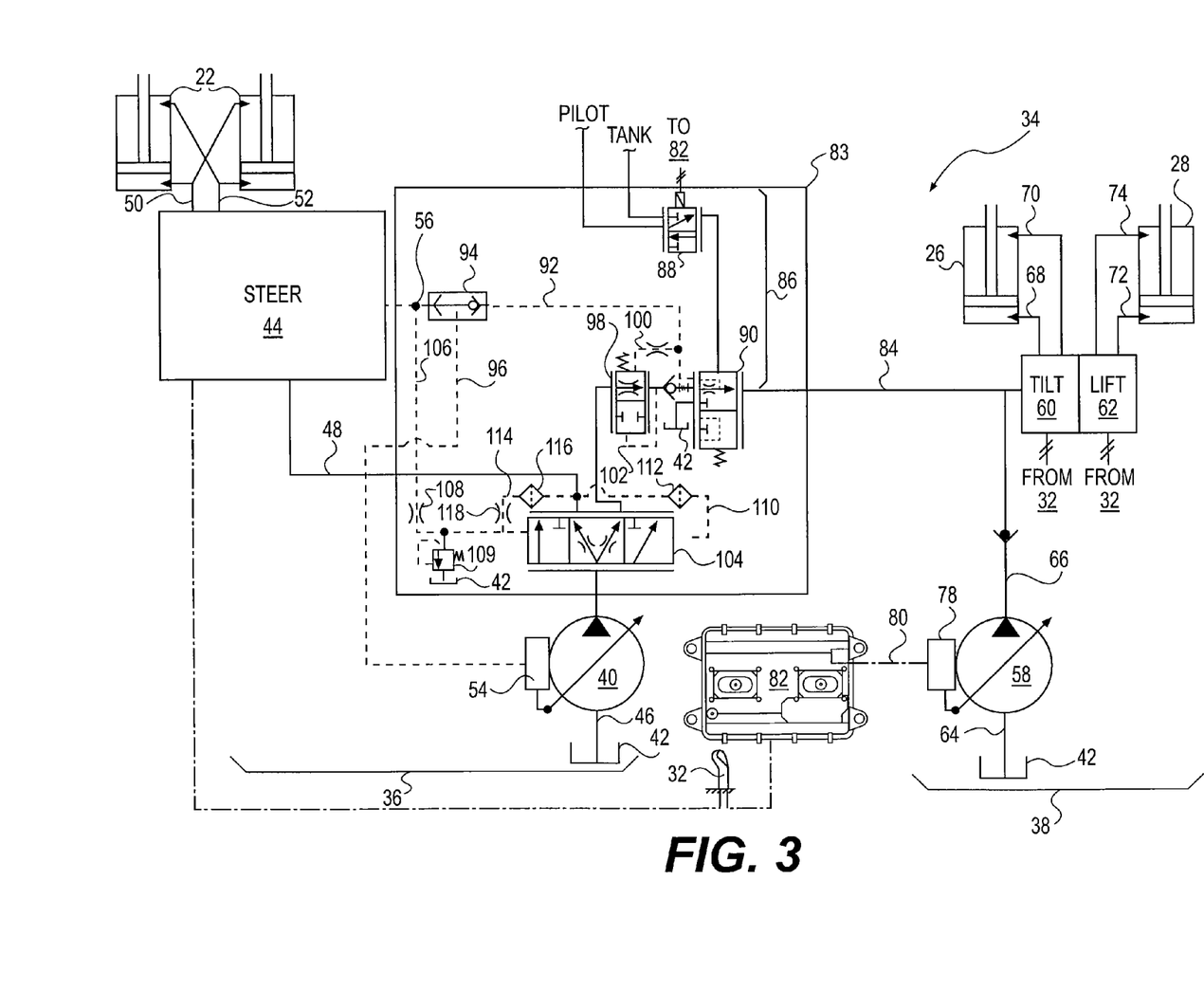
FIG. 3 is a schematic and diagrammatic illustration of the hydraulic system of FIG. 2 during a second mode of operation.

Movement of pilot-operated element 90 between the first and second positions may have an effect on signal generation within a load-sense passage 92. In particular, when pilot-operated element 90 is in the first position, fluid pressure within load-sense passage 92 may be have a value corresponding to a load of implement circuit 38 (i.e., the pressure of fluid within load-sense passage 92 may be substantially equal to a pressure within supply passage 66 and/or tilt and lift control valves 60, 62). When pilot-operated element 90 is in the second position, the pressure of fluid within load-sense passage 92 may have a value corresponding to a pressure within low-pressure reservoir 42 (i.e., pilot-operated element 90 may connect load-sense passage 92 to low-pressure reservoir 42 when in the second position).

A resolver 94 may selectively allow the higher-pressure signal from load-sense passages 56 and 92 to control the displacement of steering pump 40. Specifically, resolver 94 may embody a two-position shuttle valve that is movable in response to fluid pressure between a first position (shown in FIG. 2) at which the signal from load-sense passage 56 is fluidly communicated with stroke-adjusting mechanism 54, and a second position (shown in FIG. 4) at which the signal from load-sense passage 94 is fluidly communicated with stroke-adjusting mechanism 54. The shuttle valve of resolver 94 may be moved to the first position when a pressure of load-sense passage 56 is greater than the pressure of load-sense passage 92, and vice versa. Resolver 94 may be fluidly connected to stroke-adjusting mechanism 54 by way of a load-sense passage 96.

A pressure-compensator 98 may be disposed within supplemental supply passage 84, at a location upstream of control valve 86. Pressure compensator 98 may include a spring-biased valve element that is movable between a first position (shown in FIG. 2) at which fluid in supplemental supply passage 84 is allowed to flow through pressure compensator 98 to control valve 86, and a second position (not shown) at which fluid flow through pressure compensator 98 is inhibited by pressure compensator 98. A restricted passage 100 at one end of pressure compensator 98 may allow pilot fluid from load-sense passage 92 to join a spring bias in moving pressure compensator 98 toward the first position. A pilot passage 102 at an opposing end of pressure compensator 98 may allow a pilot pressure signal from a location between pressure compensator 98 and control valve 86 to urge pressure compensator 98 against the spring bias toward the second position. In this configuration, pressure-compensator 98 may function to maintain a desired pressure drop across pilot-operated element 90, the desired pressure drop coupled with a known position of pilot-operated element 90 providing for a desired flow rate of fluid from steering circuit 36 to implement circuit 38. In this manner, responsiveness and control of implement circuit 38 may be maintained, even during flow sharing.

Throughout operation of hydraulic system 34, flow priority may be provided to steering circuit 36. For this purpose, a priority valve 104 may be disposed between steering pump 40 and supplemental supply passage 84 and operational to allow only excess fluid from steering pump 40 (i.e., fluid not demanded, required, or consumed by steering control valve 44) to flow into supplemental supply passage 84. Priority valve 104 may be pilot-operated and spring-biased to move between a first position (shown in FIG. 2) at which all flow from steering pump 40 passes to steering control valve 44, and a second position (shown in FIG. 4) at which all flow from steering pump 40 passes through supplemental supply passage 84 to tilt and lift control valves 60, 62. It should be noted that, although FIGS. 2 and 4 show priority valve 104 in two discrete positions, one skilled in the art will recognize that priority valve 104 may be infinitely variable and moved to any position between the first and second positions (represented by FIG. 3) to thereby proportionally split the flow from steering pump 40 between steering control valve 44 and supplemental supply passage 84.

A first pilot passage 106 may be fluidly connected to direct fluid from load-sense passage 56 to a first end of priority valve 104 to join a spring bias in urging priority valve 104 toward the first position. In one exemplary embodiment, a restricted orifice 108 may be positioned within and a pressure relief valve 109 may be associated with first pilot passage 106, if desired, to help reduce instabilities and pressure spikes within steering circuit 36. A second pilot passage 110 may be fluidly connected to direct pressurized fluid from a location downstream of priority valve 104 to a second end of priority valve 104 to urge priority valve 104 against the spring bias toward the second position. A filter 112 may be disposed within second pilot passage 110, if desired. An optional third pilot passage 114 may be fluidly connected to direct pressurized fluid from a location downstream of priority valve 104 through a filter 116 and a restricted orifice 118 to the first end of priority valve 104. With this configuration, third pilot passage 114 may function to affect a response and/or stability of priority valve 104.

Figure 4:
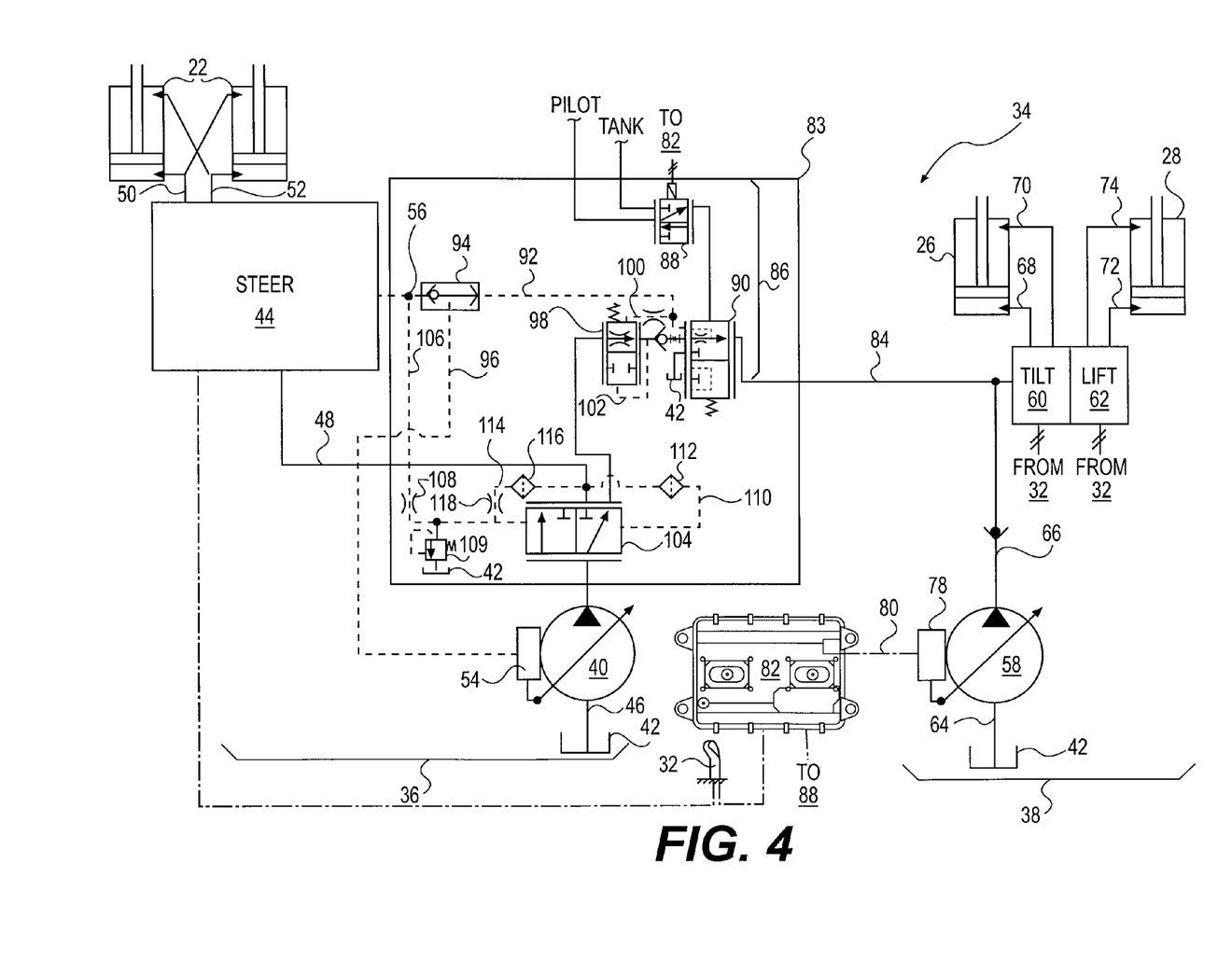
FIG. 4 is a schematic and diagrammatic illustration of the hydraulic system of FIG. 2 during a third mode of operation.

FIGS. 3 and 4 illustrate different operating modes of hydraulic system 34. FIGS. 3 and 4 will be discussed in more detail in the following section to better illustrate the disclosed system and its operation.

INDUSTRIAL APPLICABILITY

The disclosed hydraulic system may be applicable to any machine having a load-sense controlled steering pump and an E/H-controlled implement pump or vice versa. The disclosed hydraulic system may provide for the sharing of pressurized fluid from the steering pump to an implement circuit after the implement pump has reached a threshold or maximum displacement position. Operation of hydraulic system 34 will now be explained.

As shown in FIGS. 1 and 2, hydraulic actuators 22 may be movable by fluid pressure to affect steering of machine 10. During operation of machine 10, power source 14 may produce a mechanical and/or electrical output that drives steering pump 40 to pressurize fluid directed to steering control valve 44. Steering control valve 44 may selectively allow the pressurized fluid to flow through one of passages 50, 52, while simultaneously draining fluid from the other of passages 50, 52 to create a force imbalance within each of hydraulic actuators 22 that causes the respective hydraulic actuators 22 to either extend or retract. The extension of hydraulic actuator 22 on one side of machine 10 paired with the retraction of hydraulic actuator 22 on the opposite side of machine 10 may create a moment about steering component 16 that causes the forward-end of machine 10 to pivot relative to the back-end of machine 10.

During steering of machine 10, a demand for pressurized fluid from steering pump 40 may change. For example, an operator may indicate via operator interface device 32 a desire to increase or decrease a turning radius of machine 10. In response to this input, steering control valve 44 may move to allow more or less fluid flow to hydraulic actuators 22. When steering control valve 44 moves to allow more or less fluid flow to hydraulic actuators 22, pressures within steering circuit 36 may change, and the signal from load-sense passage 56 may provide an indication of these changes in pressure to stroke-adjustment mechanism 54 of steering pump 40, thereby causing stroke-adjustment mechanism 54 to adjust an output of steering pump 40 and accommodate the changing demand for fluid flow. When the pressure signal from load-sense passage 56 indicates a reduction in fluid demand, stroke-adjustment mechanism 54 may be caused to de-stroke steering pump 40 and a capacity of steering pump 40 to share pressurized fluid with implement circuit 38 may increase. The pressure signal from load-sense passage 56 may also be directed to priority valve 104, as will be described in more detail below.

As also shown in FIGS. 1 and 2, hydraulic actuators 26, 28 may be movable by fluid pressure to affect movement of implement 18. During operation of machine 10, the mechanical and/or electrical output of power source 14 may be directed to drive implement pump 58 to pressurize fluid directed to tilt and lift control valves 60, 62. Tilt and lift control valves 60, 62 may selectively allow the pressurized fluid to flow through one of head-end and rod-end passages 68, 72 and 70, 74, while simultaneously draining fluid from the other of head-end and rod-end passages 68, 72 and 70, 74 to create force imbalances within hydraulic actuators 26, 28 that cause hydraulic actuators to extend and retract. The extension of hydraulic actuators 26, 28 may cause implement 18 to lift and dump, while the retraction of hydraulic actuators 26, 28 may cause implement 18 to lower and rack back.

During movement of implement pump 58, a demand for pressurized fluid from implement pump 58 may change. For example, an operator may indicate via operator interface device 32 a desire to lift, lower, dump, and/or rack implement 18 at an increasing or decreasing velocity. In response to this input, controller 82 may electronically direct implement pump 58 via stroke-adjustment mechanism 78 to adjust its output and simultaneously cause the appropriate tilt and lift control valves 60, 62 to proportionally connect the output from implement pump 58 to head- and rod-end passages 68-74. As implement pump 58 is caused to increase its output, a maximum displacement position may eventually be reached. If unaccounted for, any further manipulation of operator interface device 32 calling for more output from implement pump 58 may have little or no effect on the movement of implement 18. For this reason, after stroke-adjustment mechanism 78 has reached its maximum displacement position, flow sharing between steering circuit 36 and implement circuit 38 may begin.

FIG. 2 may represent a first mode of machine operation. In this mode of operation, implement 18 may be requested to move at a rate within the capacity of implement pump 58 (i.e., at a rate that requires flow output of implement pump 58 less than a maximum flow output). During this mode of operation, priority valve 104 may be in its first position and all fluid from steering pump 40 may be directed to only steering circuit 36. No flow sharing may occur during this mode of operation.

FIG. 3 may represent a second mode of machine operation. In this mode of operation, implement 18 may be requested to move at a rate that exceeds the capacity of implement pump 58. In response to this request or, alternatively, in response to stroke-adjustment mechanism 78 moving to the maximum displacement position after receipt of the request, solenoid-operated element 88 of control valve 86 may be energized to move to its flow-passing position. When solenoid-operated element 88 moves to its flow-passing position, pilot fluid may be directed to move pilot-operated element 90 a desired distance toward its flow-passing position, thereby allowing fluid within supplemental supply passage 84 to flow through pilot-operated element 90 at a desired rate. At this point in time, if steering pump 40 has excess capacity (i.e., if steering pump 40 can pressurize fluid at a rate greater than demanded or consumed by steering control valve 44), a pressure within supply passage 48 and second pilot passage 110 may be sufficient to urge priority valve 104 a distance toward the second position to pass some of the fluid pressurized by steering pump 40 to supplemental supply passage 84. The distance that priority valve 104 moves toward the second position may be dependent upon the amount of excess capacity of steering pump 40. For example, as steering control valve 44 demands or consumes less fluid from steering pump 40, priority valve 104 may be moved further toward the second position because the fluid pressure within second pilot passage 110 may increase relative to the fluid pressure within first pilot passage 106.

As pilot-operated element 90 moves toward its flow-passing position, the signal within load-sense passage 92 may be generated and directed to resolver 94. Depending on which of the signals from load-sense passages 56 and 92 has the greater value (i.e., the greater pressure), stroke-adjustment mechanism 54 may adjust the stroke of steering pump 40 based on a demand of steering circuit 36 or implement circuit 38. Thus, the higher demand for fluid may drive operation of steering pump 40 such that all demands of steering and implement circuits 36, 38 may be satisfied.

FIG. 4 illustrates a third mode of machine operation. In this mode of operation, steering of machine 10 may not be occurring, and implement 18 may be requested to move at a rate that exceeds the capacity of implement pump 58. In response to this request or, alternatively, in response to stroke-adjustment mechanism 78 moving to the maximum displacement position after receipt of the request, solenoid-operated element 88 of control valve 86 may be energized to move to its flow-passing position. When solenoid-operated 88 moves to its flow-passing position, pilot fluid may be directed to move pilot-operated element 90 a desired distance toward its flow-passing position, thereby allowing a desired amount of fluid within supplemental supply passage 84 to flow through pilot-operated element 90. Because steering may not be occurring at this time, the signal within load-sense passage 56 may be small or nonexistent and steering pump 40 may have excess capacity, all of which may be shared with implement circuit 38. Accordingly, a pressure within supply passage 48 and second pilot passage 110 may be sufficient to overcome the pressure signal of load-sense passage 56 and the spring bias of priority valve 104 to urge priority valve 104 all the way to its second position and pass all of the pressurized fluid from steering pump 40 to supplemental supply passage 84.

As pilot-operated element 90 moves toward its flow-passing position, the signal within load-sense passage 92 may be generated and directed to resolver 94. Because no steering may be occurring during the third mode of operation, the value of the signal from load-sense passage 56 may be very low or non-existent. Accordingly, the signal from load-sense passage 92 may have the greater value (i.e., the greater pressure), and stroke-adjustment mechanism 54 may adjust the stroke of steering pump 40 based on a demand of only implement circuit 38.

Pressure compensator 98, in conjunction with control valve 86, may help to facilitate flow sharing from load-sense controlled steering pump 40 with implement circuit 38 having E/H-controlled implement pump 58. In particular, as described above, an E/H-controlled implement pump is a pump with output that is electronically controlled based on operator input. In order to responsively meet demands that exceed the capacity of E/H-controlled implement pump 58 in a predictable manner, the shared fluid must be provided at a desired flow rate that is proportional to operator input. Pressure compensator 98 may help to maintain a desired pressure drop across pilot-operated element 90 that has been opened to a known flow-passing position, the desired pressure drop combined with the known flow-passing position providing the desired flow rate of shared fluid. For this reason, pressurized fluid flow from load-sense controlled steering pump 40 can be shared with implement circuit 38, while still providing predictable implement response. In addition, by only sharing fluid between circuits in response to operator input and after a maximum capacity of implement circuit 38 has been reached, an efficiency of hydraulic system 34 may be high.

It will be apparent to those skilled in the art that various modifications and variations can be made to the disclosed hydraulic system without departing from the scope of the disclosure. Other embodiments of the invention will be apparent to those skilled in the art from consideration of the specification and practice of the hydraulic system disclosed herein. It is intended that the specification and examples be considered as exemplary only, with a true scope of the disclosure being indicated by the following claims and their equivalents.

What is claimed is:

1. A hydraulic system, comprising:
   a first pump having variable displacement and being load-sense controlled;
   a first hydraulic circuit associated with the first pump;
   a second pump having variable displacement and being electro-hydraulically controlled;
   a second hydraulic circuit associated with the second pump; and
   a flow-sharing valve arrangement configured to selectively share fluid flow between the first and second hydraulic circuits, wherein the flow-sharing valve arrangement is operable to share fluid flow between the first and second hydraulic circuits only when a displacement of the second pump is at a threshold position, wherein the threshold position is a maximum displacement position.

2. The hydraulic system of claim 1, wherein:
   the first hydraulic circuit is a steering circuit; and
   the second hydraulic circuit is an implement circuit.

3. The hydraulic system of claim 1, wherein the flow-sharing valve arrangement includes a priority valve configured to provide flow priority from the first pump to the first hydraulic circuit based on a pressure of the first hydraulic circuit.

4. The hydraulic system of claim 3, wherein the flow-sharing valve arrangement further includes a resolver configured to direct a load signal to the first pump from the one of the first and second hydraulic circuits having a higher pressure.

5. The hydraulic system of claim 3, wherein the flow-sharing valve arrangement further includes a flow control valve operable to selectively allow and inhibit fluid flow from the first hydraulic circuit to the second hydraulic circuit.

6. The hydraulic system of claim 5, wherein the flow-sharing valve arrangement further includes a resolver configured to direct a load signal to the first pump from the one of the first and second hydraulic circuits having a higher pressure, wherein the flow control valve includes:
   a first valve element that is pilot-operated to move between a first position at which fluid flow from the first hydraulic circuit to the second hydraulic circuit is inhibited and at which the resolver is fluidly communicated with a low-pressure reservoir, and a second position at which fluid flow from the first hydraulic circuit to the second hydraulic circuit is allowed and at which the resolver is fluidly communicated with a pressure of the second hydraulic circuit; and a second valve element that is solenoid-operated to selectively direct pilot flow to move the first valve element.

7. The hydraulic system of claim 6, further including a controller in communication with the second pump and the second valve element, the controller being configured to selective activate the second valve element based on a displacement position of the second pump.

8. The hydraulic system of claim 7, further including a pressure compensator located upstream of the flow control valve.

9. The hydraulic system of claim 3, further including:
a steering control valve disposed within the first hydraulic circuit to receive pressurized fluid from the first pump;
a first passage fluidly communicating an outlet of the steering control valve with a first end of the priority valve to urge the priority valve together with a spring bias in a steering priority direction; and
a second passage fluidly communicating an outlet of the priority valve with a second end of the priority valve to urge the priority valve against the spring bias in an implement priority direction.

10. The hydraulic system of claim 9, further including:
a restricted orifice located within the first passage; and
a filter located within the second passage.

11. The hydraulic system of claim 10, further including a pressure-relief valve associated with the first passage.

12. A method of sharing fluid between a steering circuit and an implement circuit, comprising:
pressurizing fluid with a steering pump of the steering circuit based on a pressure within the steering circuit;
pressurizing fluid with an implement pump of the implement circuit based on an operator demand for fluid in the implement circuit;
determining that a maximum capacity of the implement pump for pressurizing fluid within the implement circuit has been reached; and
selectively sharing pressurized fluid from the steering pump of the steering circuit with the implement circuit based on the determination.

13. The method of claim 12, wherein only excess pressurized fluid from the steering pump of the steering circuit is shared with the implement circuit.

14. The method of claim 12, further including changing a rate of fluid pressurizing of the steering pump based on a higher one of a pressure of the steering circuit and a pressure of the implement circuit.

15. The method of claim 12, wherein selectively sharing includes providing a known flow rate of fluid from the steering circuit to the implement circuit based on a controlled pressure differential in the shared fluid.

16. A machine, comprising:
a frame;
an engine supported by the frame;
a steering component connected to the frame;
a steering actuator associated with the steering component to move the steering component;
a steering pump having variable displacement and being configured to pressurize fluid directed to the steering actuator at a rate dependent on a sensed load of the steering actuator;
an implement;
an implement actuator associated with the implement to move the implement relative to the frame;
an implement pump having variable displacement and being configured to pressurize fluid directed to the implement actuator at a rate dependent on an operator command to move the implement actuator; and
a flow-sharing valve arrangement configured to selectively direct fluid from the steering pump to the implement actuator when a displacement of the implement pump is at a maximum position.

17. The machine of claim 16, wherein the flow-sharing valve arrangement includes:
a priority valve configured to provide flow priority from the steering pump to the steering actuator; and
a resolver configured to direct a load signal to the steering pump from the one of the steering actuator and the implement actuator having a higher pressure.

18. The machine of claim 17, wherein the flow-sharing valve arrangement further includes:
a pilot-operated flow control valve operable to selectively allow and inhibit fluid flow from the steering pump to the implement actuator; and
a pressure compensator located upstream of the pilot-operated flow control valve.

* * * * *